US012649635B2

(12) United States Patent
Namiki

(10) Patent No.: US 12,649,635 B2
(45) Date of Patent: Jun. 9, 2026

(54) IMAGE READING APPARATUS

(71) Applicant: SEIKO EPSON CORPORATION,
Tokyo (JP)

(72) Inventor: Masaki Namiki, Kitakyushu (JP)

(73) Assignee: SEIKO EPSON CORPORATION,
Tokyo (JP)

( * ) Notice: Subject to any disclaimer, the term of this
patent is extended or adjusted under 35
U.S.C. 154(b) by 299 days.

(21) Appl. No.: 18/472,357

(22) Filed: Sep. 22, 2023

(65) Prior Publication Data

US 2024/0101368 A1     Mar. 28, 2024

(30) Foreign Application Priority Data

Sep. 26, 2022     (JP) ................................. 2022-152239

(51) Int. Cl.
| *B65H 3/34* | (2006.01) |
| *B65H 3/06* | (2006.01) |
| *B65H 3/56* | (2006.01) |
| *H04N 1/00* | (2006.01) |

(52) U.S. Cl.
CPC .............. *B65H 3/34* (2013.01); *B65H 3/063*
(2013.01); *B65H 3/0676* (2013.01); *B65H
3/56* (2013.01); *H04N 1/00588* (2013.01);
*B65H 2403/40* (2013.01); *B65H 2404/60*
(2013.01); *B65H 2801/39* (2013.01)

(58) Field of Classification Search
CPC ........ B65H 3/063; B65H 3/0676; B65H 3/34;
B65H 3/0607; B65H 3/56; B65H 3/54;
B65H 3/565; B65H 3/66; B65H 3/523
See application file for complete search history.

(56) References Cited

U.S. PATENT DOCUMENTS

| 7,410,161 B2 * | 8/2008 | Yamamoto ............. B65H 31/26 |
| | | 271/124 |
| 10,625,965 B2 * | 4/2020 | Kuriki .................... B65H 3/063 |

FOREIGN PATENT DOCUMENTS

JP          2017071484 A      4/2017

* cited by examiner

*Primary Examiner* — Jeremy R Severson
(74) *Attorney, Agent, or Firm* — CHIP LAW GROUP

(57) ABSTRACT

An image reading apparatus includes a first displacement member configured to be displaced between a first non-contact position at which a medium and a feeding roller do not contact with each other and a first contact position at which those contact with other, and a second displacement member configured to be displaced between a second non-contact position at which the medium and the feeding roller do not contact with each other and a second contact position at which those contact with other. The second displacement member is displaced from the second non-contact position to the second contact position as the first displacement member is displaced from the first non-contact position to the first contact position, and is displaced from the second contact position to the second non-contact position as the first displacement member is displaced from the first contact position to the first non-contact position.

10 Claims, 15 Drawing Sheets

IMAGE READING APPARATUS

The present application is based on, and claims priority from JP Application Serial Number 2022-152239, filed Sep. 26, 2022, the disclosure of which is hereby incorporated by reference herein in its entirety.

BACKGROUND

1. Technical Field

The present disclosure relates to an image reading apparatus.

2. Related Art

Various image reading apparatuses have been used in the related art. There exists an image reading apparatus including a reading unit for an image, a feeding roller that feeds a medium in a feeding direction, and an auxiliary feeding member such as an auxiliary feeding roller that is provided upstream of the feeding roller in the feeding direction and feeds the medium with the feeding roller. It is possible to feed the medium without the auxiliary feeding member, but medium feeding performance is improved with the auxiliary feeding member. For example, JP-A-2017-71484 discloses an image reading apparatus including an image reading unit, a first feeding roller corresponding to an auxiliary feeding roller, and a second feeding roller corresponding to a feeding roller.

However, in the related-art image reading apparatus including the reading unit for an image, the feeding roller, and the auxiliary feeding member, such as the image reading apparatus in JP-A-2017-71484, the medium contacts with the auxiliary feeding member to cause damage at the time of setting the medium. This is because the auxiliary feeding member such as an auxiliary feeding roller is formed of a material having a high frictional force with respect to the medium so as to feed the medium, and the force is applied in a state in which the medium contacts with the auxiliary feeding member at the time of setting the medium. Thus, the related-art image reading apparatus including the reading unit for an image, the feeding roller, and the auxiliary feeding member imposes a great burden on a user at the time of setting the medium, and improvement of medium setting performance has been demanded.

SUMMARY

In order to solve the above-mentioned problem, an image reading apparatus according to the present disclosure includes a reading unit configured to read an image on a medium, a medium placement unit on which the medium is placed, a feeding roller configured to feed the medium placed on the medium placement unit in a feeding direction, an auxiliary feeding roller being provided upstream of the feeding roller in the feeding direction and being configured to feed the medium with the feeding roller, a first displacement member configured to be displaced between a first non-contact position and a first contact position, the first non-contact position being a position at which the medium placed on the medium placement unit and the feeding roller do not contact with each other in a feeding standby state in which the feeding roller and the auxiliary feeding roller stand by for feeding of the medium, the second contact position being a position at which the medium placed on the medium placement unit and the feeding roller contact with each other in a feeding state in which the feeding roller and the auxiliary feeding roller feed the medium, and a second displacement member configured to be displaced between a second non-contact position and a second contact position, the second non-contact position being a position at which the medium placed on the medium placement unit and the auxiliary feeding roller do not contact with each other in the feeding standby state, the second contact position being a position at which the medium placed on the medium placement unit and the auxiliary feeding roller contact with each other in the feeding state, wherein the second displacement member is displaced from the second non-contact position to the second contact position as the first displacement member is displaced from the first non-contact position to the first contact position, and the second displacement member is displaced from the second contact position to the second non-contact position as the first displacement member is displaced from the first contact position to the first non-contact position.

Further, in order to solve the above-mentioned problem, an image reading apparatus according to the present disclosure includes a reading unit configured to read an image on a medium, a medium placement unit on which the medium is placed, a feeding roller configured to feed the medium placed on the medium placement unit in a feeding direction, an auxiliary feeding member being provided upstream of the feeding roller in the feeding direction and being configured to feed the medium with the feeding roller, and a first displacement member configured to be displaced between a first non-contact position and a first contact position, the first non-contact position being a position at which the medium placed on the medium placement unit and the feeding roller do not contact with each other in a feeding standby state in which the feeding roller and the auxiliary feeding member stand by for feeding of the medium, the first contact position being a position at which the medium placed on the medium placement unit and the feeding roller contact with each other in a feeding state in which the feeding roller and the auxiliary feeding member feed the medium; wherein the auxiliary feeding member contacts with the medium placed on the medium placement unit as the first displacement member is displaced from the first non-contact position to the first contact position, and the auxiliary feeding member does not contact with the medium placed on the medium placement unit as the first displacement member is displaced from the first contact position to the first non-contact position.

DESCRIPTION OF EMBODIMENTS

Figure 1:
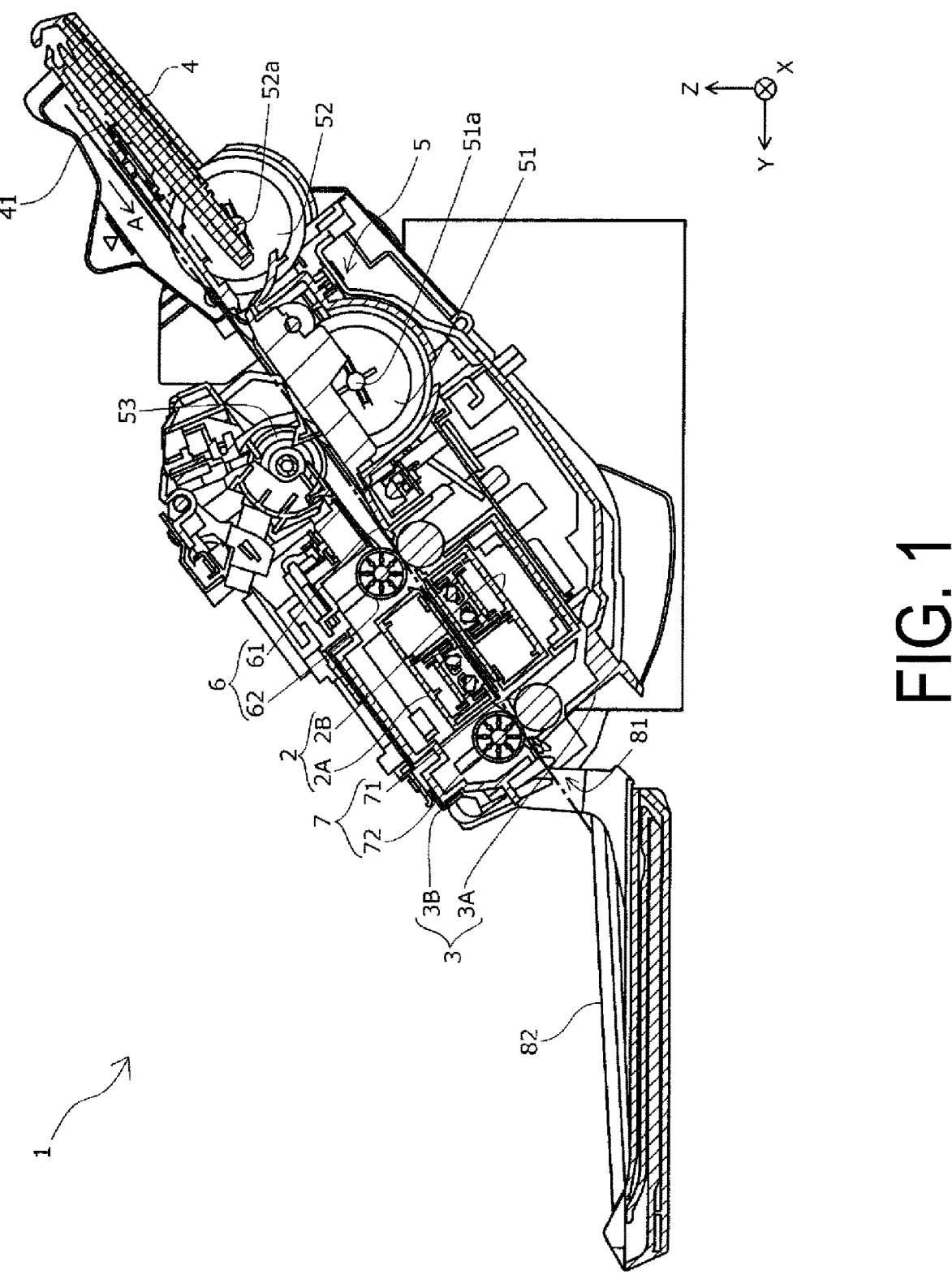
FIG. 1 is a side cross-sectional view illustrating an internal configuration of an image reading apparatus according to a first exemplary embodiment of the present disclosure.

Hereinafter, the present disclosure is schematically described.

An image reading apparatus according to a first aspect of the present disclosure includes a reading unit configured to read an image on a medium, a medium placement unit on which the medium is placed, a feeding roller configured to feed the medium placed on the medium placement unit in a feeding direction, an auxiliary feeding roller being provided upstream of the feeding roller in the feeding direction and being configured to feed the medium with the feeding roller, a first displacement member configured to be displaced between a first non-contact position and a first contact position, the first non-contact position being a position at which the medium placed on the medium placement unit and the feeding roller do not contact with each other in a feeding standby state in which the feeding roller and the auxiliary feeding roller stand by for feeding of the medium, the second contact position being a position at which the medium placed on the medium placement unit and the feeding roller contact with each other in a feeding state in which the feeding roller and the auxiliary feeding roller feed the medium, and a second displacement member configured to be displaced between a second non-contact position and a second contact position, the second non-contact position being a position at which the medium placed on the medium placement unit and the auxiliary feeding roller do not contact with each other in the feeding standby state, the second contact position being a position at which the medium placed on the medium placement unit and the auxiliary feeding roller contact with each other in the feeding state, wherein the second displacement member is displaced from the second non-contact position to the second contact position as the first displacement member is displaced from the first non-contact position to the first contact position, and the second displacement member is displaced from the second contact position to the second non-contact position as the first displacement member is displaced from the first contact position to the first non-contact position.

According to the present aspect, the second displacement member is included. The second displacement member can be displaced between the second non-contact position at which the medium placed on the medium placement unit and the auxiliary feeding roller do not contact with each other in the feeding standby state and the second contact position at which the medium placed on the medium placement unit and the auxiliary feeding roller contact with each other in the feeding state. The second displacement member is displaced from the second non-contact position to the second contact position as the first displacement member is displaced from the first non-contact position to the first contact position, and is displaced from the second contact position to the second non-contact position as the first displacement member is displaced from the first contact position to the first non-contact position. In other words, there is included the second displacement member that prevents contact between the medium and the auxiliary feeding roller in the feeding standby state of setting the medium and allows contact between the medium and the auxiliary feeding roller in the feeding state of reading an image on the medium. Thus, the auxiliary feeding roller is included, and hence feeding performance is improved. At the same time, the medium and the auxiliary feeding roller do not contact with each other in the feeding standby state of setting the medium, and hence setting performance of the medium can be improved.

Further, a second aspect according to the present disclosure is the image reading apparatus according to the first aspect described above, including a first gear provided to a rotary shaft of the feeding roller, a second gear provided to a rotary shaft of the auxiliary feeding roller, and a gear train configured to be meshed with the first gear and the second gear, wherein the gear train is provided between the first gear and the second gear in the feeding direction, and is provided on an opposite side of the second displacement member from the auxiliary feeding roller in a width direction intersecting with the feeding direction.

According to the present aspect, there is included the gear train that is meshed with the first gear provided to the rotary shaft of the feeding roller and the second gear provided to the rotary shaft of the auxiliary feeding roller, and the gear train is provided between the first gear and the second gear, and is provided on the side opposite to the auxiliary feeding roller in the width direction with the second displacement member as a reference. The gear train is arranged as described above. Thus, the gear train can efficiently be arranged in the apparatus, and size increase of the apparatus can be suppressed.

Further, a third aspect according to the present disclosure is the image reading apparatus according to the first aspect or the second aspect described above, wherein a feeding speed at which the auxiliary feeding roller feeds the medium is lower than a feeding speed at which the feeding roller feeds the medium.

According to the present aspect, the feeding speed at which the auxiliary feeding roller feeds the medium is lower than the feeding speed at which the feeding roller feeds the medium. Thus, the medium can be fed in a state in which the medium is pulled in the feeding direction, and feeding performance of the medium can particularly be improved.

Further, a fourth aspect according to the present disclosure is the image reading apparatus according to any one of the first aspect to the third aspect described above, wherein the auxiliary feeding roller has elasticity higher than that of the feeding roller.

According to the present aspect, the auxiliary feeding roller has elasticity higher than that of the feeding roller. In other words, the auxiliary feeding roller contacts with the medium in a contact area that is wider and softer than the feeding roller to feed the medium. Thus, feeding performance of the medium can particularly be improved.

Further, a fifth aspect according to the present disclosure is the image reading apparatus according to the fourth aspect described above, including a separating roller being provided at a position facing the feeding roller and being configured to, when a plurality of media are placed on the medium placement unit, separate one of the media by nipping the one of the media with the feeding roller, wherein the separating roller has elasticity higher than that of the feeding roller.

According to the present aspect, there is provided the separating roller that is provided at the position facing the feeding roller, is capable of, when the plurality of media are placed on the medium placement unit, separating one of the media by nipping the one of the media with the feeding roller when the plurality of media are placed on the medium placement unit, and has elasticity higher than that of the feeding roller. Thus, when the plurality of media are set on the medium placement unit, one of the media can be separated at a high accuracy.

Further, a sixth aspect according to the present disclosure is the image reading apparatus according to any one of the first aspect to the fifth aspect described above, wherein, when the feeding roller and the auxiliary feeding roller start feeding the medium, the feeding roller and the auxiliary feeding roller rotate, the first displacement member is displaced from the first non-contact position to the first contact position, and the second displacement member is displaced from the second non-contact position to the second contact position.

According to the present aspect, when feeding of the medium is started, the feeding roller and the auxiliary feeding roller rotate, the first displacement member is displaced from the first non-contact position to the first contact position, and the second displacement member is displaced from the second non-contact position to the second contact position. With this configuration, soon after feeding of the medium is started, a medium feeding force can be applied to the feeding roller and the auxiliary feeding roller.

Further, a seventh aspect according to the present disclosure is the image reading apparatus according to any one of the first aspect to the sixth aspect described above, wherein, when the feeding roller and the auxiliary feeding roller finish feeding the medium, the first displacement member is displaced from the first contact position to the first non-contact position, the second displacement member is displaced from the second contact position to the second non-contact position, and the feeding roller and the auxiliary feeding roller stop rotating.

According to the present aspect, when feeding of the medium is finished, the first displacement member is displaced from the first contact position to the first non-contact position, the second displacement member is displaced from the second contact position to the second non-contact position, and the feeding roller and the auxiliary feeding roller stop rotating. With this configuration, when the subsequent medium is fed, a start operation of feeding the medium can be performed soon.

Further, an eighth aspect according to the present disclosure is the image reading apparatus according to the first aspect described above, wherein the second displacement member includes a first moving portion and a second moving portion, the auxiliary feeding roller is provided between the first moving portion and the second moving portion in a width direction intersecting with the feeding direction, and when the second displacement member is at the second non-contact position, the first moving portion and the second moving portion protrude from a placement surface of the medium placement unit for the medium with respect to the auxiliary feeding roller.

According to the present aspect, the auxiliary feeding roller is provided between the first moving portion and the second moving portion in the width direction. When the second displacement member is at the second non-contact position, the first moving portion and the second moving portion protrude from the placement surface of the medium placement unit for the medium with respect to the auxiliary feeding roller. With this configuration, when the second displacement member is at the second non-contact position, the medium can effectively be prevented from contacting with the auxiliary feeding roller.

Further, a ninth aspect according to the present disclosure is the image reading apparatus according to the eighth aspect described above, wherein the first moving portion and the second moving portion are provided with inclination surfaces upstream and downstream thereof in the feeding direction, and a downstream inclination surface of the inclination surfaces that is provided downstream in the feeding direction is longer than an upstream inclination surface of the inclination surfaces that is provided upstream in the feeding direction.

According to the present aspect, the first moving portion and the second moving portion are provided with the inclination surfaces upstream and downstream thereof in the feeding direction, and the downstream inclination surface is longer than the upstream inclination surface. At the time of setting the medium, the medium can be guided along the downstream inclination surface. Thus, the medium can be guided suitably along the long downstream inclination surface.

Further, a tenth aspect according to the present disclosure is the image reading apparatus according to any one of the first aspect to the ninth aspect described above, including a transport roller pair being provided downstream of the feeding roller in the feeding direction and being configured to transport the medium fed by the feeding roller to the reading unit, wherein a driving force from a driving source rotate two rollers together that form the transport roller pair and face each other.

According to the present aspect, the driving force from the driving source rotate the two rollers together that form the transport roller pair and face each other. With this configuration, in a case of transporting a thick medium such as a booklet that requires a large transport force, the transport force can be increased more than that in a configuration in which the driving force from the driving source rotates only one of two rollers that form a transport roller pair and face each other.

Further, an image reading apparatus according to an eleventh aspect of the present disclosure includes a reading unit configured to read an image on a medium, a medium placement unit on which the medium is placed, a feeding roller configured to feed the medium placed on the medium placement unit in a feeding direction, an auxiliary feeding member being provided upstream of the feeding roller in the feeding direction and being configured to feed the medium with the feeding roller, and a first displacement member configured to be displaced between a first non-contact position and a first contact position, the first non-contact position being a position at which the medium placed on the medium placement unit and the feeding roller do not contact with each other in a feeding standby state in which the feeding roller and the auxiliary feeding member stand by for feeding of the medium, the first contact position being a position at which the medium placed on the medium placement unit and the feeding roller contact with each other in a feeding state in which the feeding roller and the auxiliary feeding member feed the medium; wherein, as the first displacement member is displaced, the auxiliary feeding member is displaced between a contact position for contacting the feeding roller and the auxiliary feeding and a non-contact position for not contacting the medium placed on the medium placement unit.

According to the present aspect, the auxiliary feeding member is displaced between the contact position and the non-contact position as the first displacement member is displaced. For example, the auxiliary feeding member contacts with the medium placed on the medium placement unit as the first displacement member is displaced from the first non-contact position to the first contact position, and does not contact with the medium placed on the medium placement unit as the first displacement member is displaced from the first contact position to the first non-contact position. With this configuration, as the feeding state of reading an image on the medium is started, in other words, the first displacement member is displaced from the first contact position to the first non-contact position, the auxiliary feeding member is capable of applying a feeding force to the medium. Further, various configurations other than, for example, the roller may be used as the auxiliary feeding member, and arrangement and a size thereof have a higher degree of freedom. Thus, the auxiliary feeding member can be prevented from contacting with the medium at the time of setting the medium, and hence setting performance of the medium can be improved.

Hereinafter, the present disclosure is specifically described.

Hereinafter, as an example of the image reading apparatus, a scanner 1 capable of reading at least one surface of a first surface and a second surface opposite to the first surface of a document is described. The scanner 1 is a so-called sheet-feed type scanner that reads an image on a document while the document being an example of a medium is moved with respect to a reading unit 2 described below. In this specification, the document includes not only a sheet-like document but also a card-like document and a booklet-like document.

In an XYZ coordinate system illustrated in each of the drawings, an X-axis direction is a width direction. A Y-axis direction is a front-and-rear direction, and a Z-axis direction is a vertical direction. In the present exemplary embodiment, a +Y direction is a direction from a rear surface to a front surface of the apparatus, and a −Y direction is a direction from the front surface to the rear surface of the apparatus. Also, a left direction as seen from the front surface of the apparatus is a +X direction, and a right direction is a −X direction. Also, hereinafter, a direction in which the document is transported may be referred to as "downstream," and a direction opposite thereto may be referred to as "upstream."

First Exemplary Embodiment

First, the scanner 1 according to the first exemplary embodiment is described with reference to FIG. 1 to FIG. 10. The scanner 1 of the present exemplary embodiment includes a medium feeding device. In the present exemplary embodiment, the medium feeding device has a configuration in which the reading unit 2 is removed from the scanner 1. However, from the viewpoint of feeding the document in the scanner 1, the entire scanner 1 including the reading unit 2 may regarded as the medium feeding device.

Figure 2:
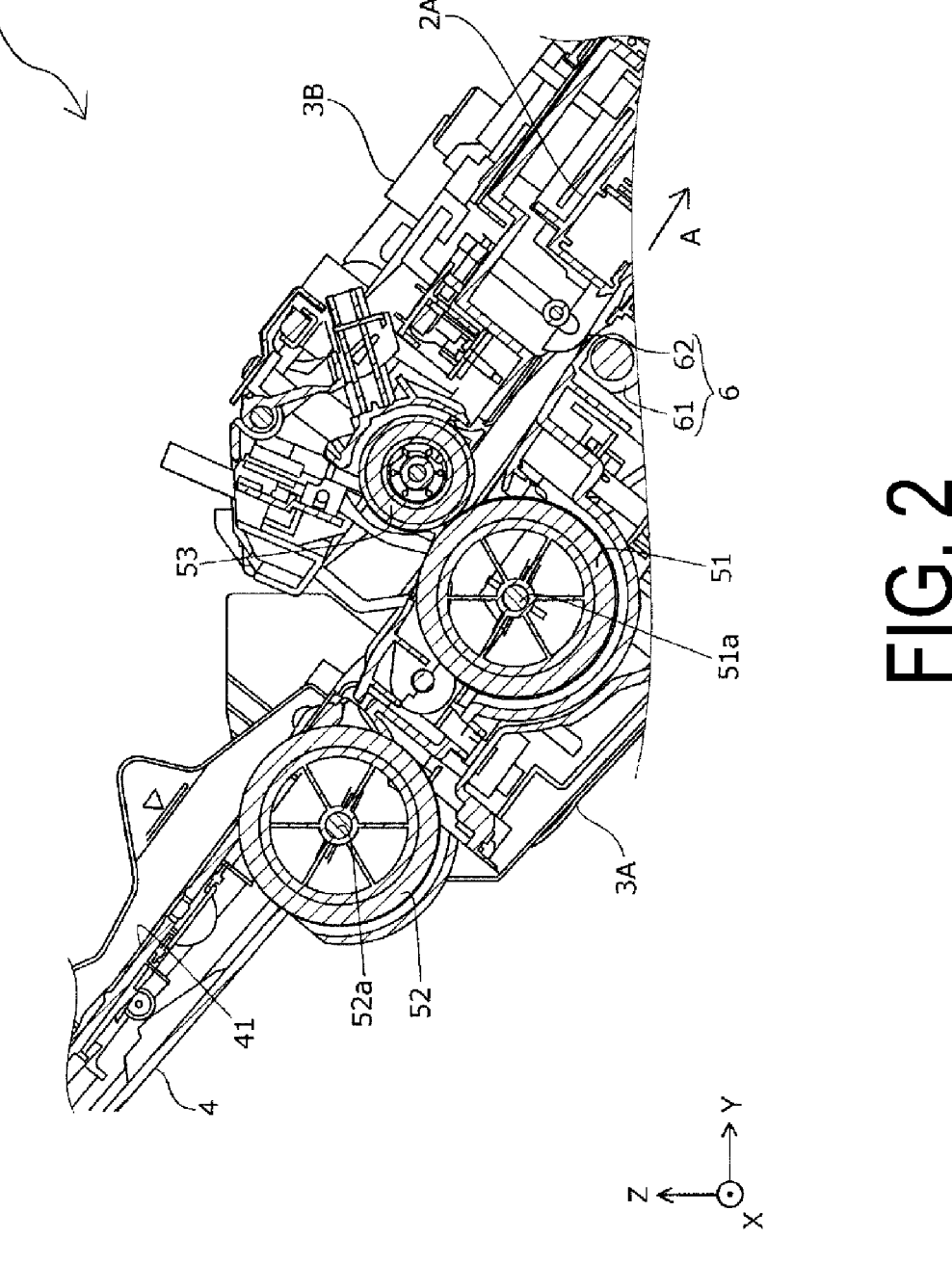
FIG. 2 is a side cross-sectional view illustrating a periphery of a feeding roller and an auxiliary feeding roller of the image reading apparatus in FIG. 1.

As illustrated in FIG. 1 and FIG. 2, the scanner 1 of the present exemplary embodiment includes a main body unit 3. The main body unit 3 includes a first unit 3A and a second unit 3B. Note that the second unit 3B rotates about a rotary shaft, which is omitted in illustration, as a reference with respect to the first unit 3A, and thus can be opened and closed. FIG. 1 and FIG. 2 illustrate a state in which the second unit 3B is closed with respect to the first unit 3A. The second unit 3B is normally in a closed state with respect to the first unit 3A, and the second unit 3B is in an opened state with respect to the first unit 3A at the time of maintenance.

As illustrated in FIG. 1 and FIG. 2, in the scanner 1 of the present exemplary embodiment, the main body unit 3 is provided with a medium placement unit 4 including a placement surface 41 on which a document is placed. Further, as a feeding unit 5 that feeds the document placed on the medium placement unit 4 in a feeding direction A, a feeding roller 51, a pick roller 52, and a separating roller 53 are provided. The feeding roller 51 includes a function of feeding the document placed on the medium placement unit 4 in the feeding direction A. Further, the pick roller 52 is provided upstream of the feeding roller 51 in the feeding direction A, and functions as the auxiliary feeding roller that feeds the document with the feeding roller 51. Further, the separating roller 53 is provided at a position facing the feeding roller 51, and includes a function of separates the document by nipping one document with the feeding roller 51 when a plurality of documents are placed on the medium placement unit 4.

Figure 3:
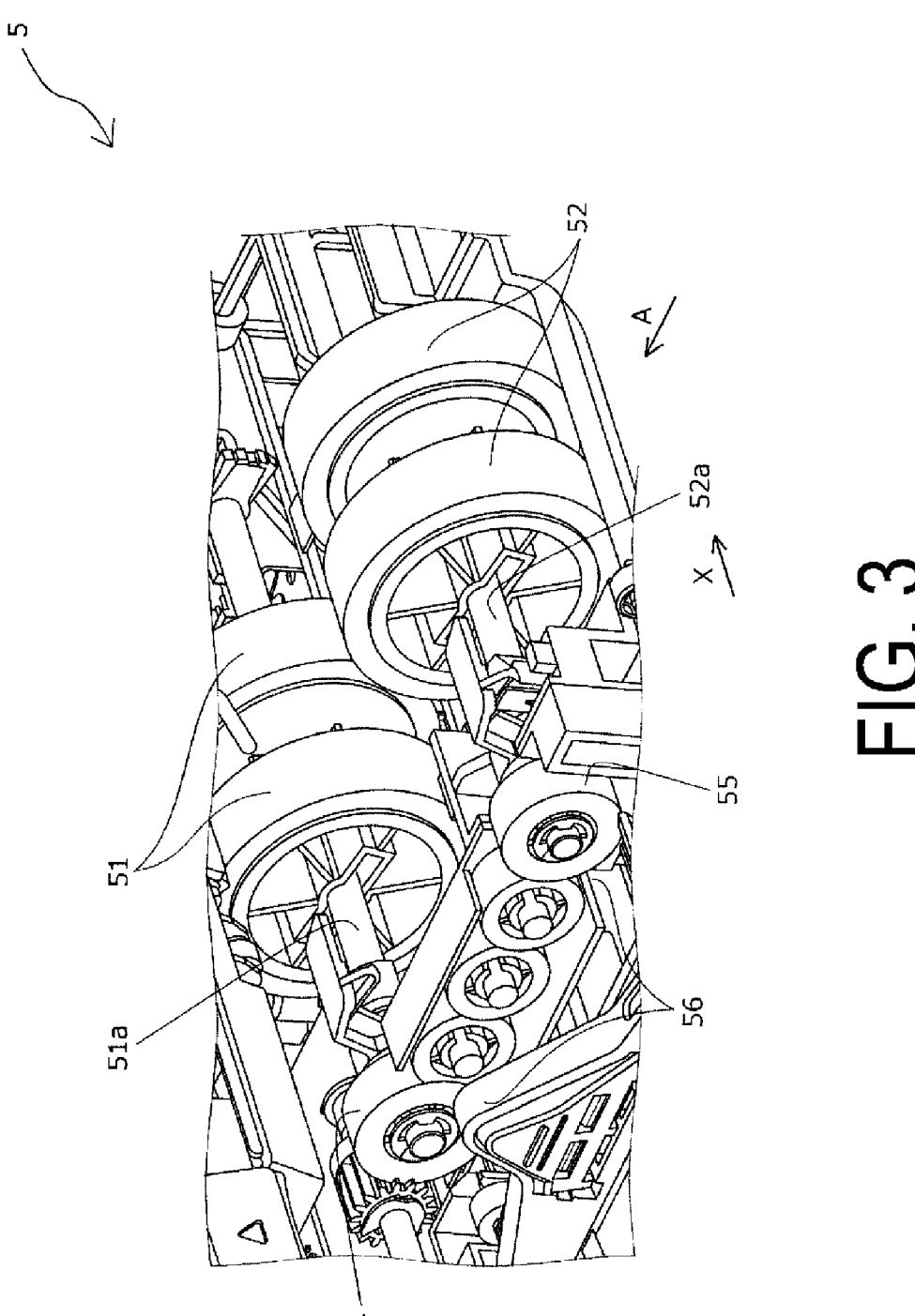
FIG. 3 is a perspective view illustrating the periphery of the feeding roller and the auxiliary feeding roller, in which some of the constituent members of the image reading apparatus in FIG. 1 are omitted.

Herein, as illustrated in FIG. 3, the feeding unit 5 includes a first gear 54 provided to a rotary shaft 51a of the feeding roller 51, and a second gear 55 provided to a rotary shaft 52a of the pick roller 52, and a gear train 56 that are meshed with the first gear 54 and the second gear 55. The feeding roller 51 and the pick roller 52 are coupled to each other via the gear train 56, and thus can rotate in synchronization with each other.

Further, as illustrated in FIG. 1 and FIG. 2, a transport roller pair 6 is provided downstream of the feeding unit 5 in the feeding direction A. The transport roller pair 6 transports the document fed by the feeding unit 5 to the reading unit 2. The transport roller pair 6 includes a driving roller 61 and a driven roller 62 that is provided to a position facing the driving roller 61 and is driven to rotate as the driving roller 61 rotates. The document fed by the feeding unit 5 to the transport roller pair 6 is nipped between the driving roller 61 and the driven roller 62, and is transported the reading unit 2 as the driving roller 61 rotates.

As illustrated in FIG. 1 and FIG. 2, the reading unit 2 includes a first reading unit 2A that reads an image on a surface of the document on one side and a second reading unit 2B that reads an image on a surface of the document of the other side. Further, as illustrated in FIG. 1, a transport roller pair 7 is provided downstream of the reading unit 2 in the feeding direction A. The transport roller pair 7 includes a driving roller 71 and a driven roller 72 that is provided to a position facing the driving roller 71 and is driven to rotate as the driving roller 71 rotates. The document transported by the transport roller pair 6 to the transport roller pair 7 is nipped between the driving roller 71 and the driven roller 72, and is discharged through a discharge port 81 to be placed on a discharge medium placement unit 82 as the driving roller 71 rotates. In FIG. 1, a transport path of the document is indicated with one-dot chain line. Note that transport in this specification is used to collectively indicate feeding and discharging.

Figure 8:
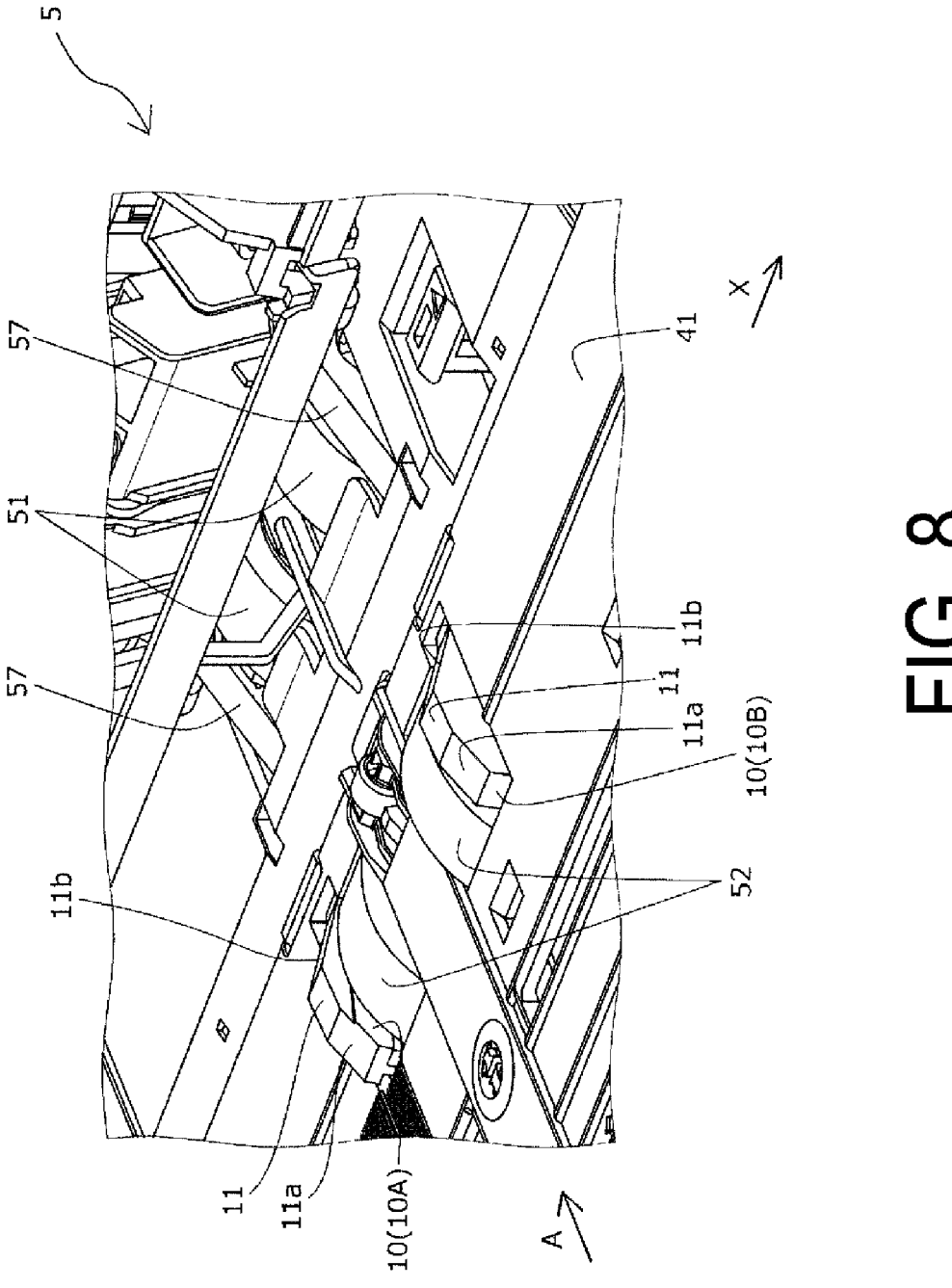
FIG. 8 is a perspective view illustrating a periphery of the auxiliary feeding roller and the second displacement member of the image reading apparatus in FIG. 1.

Next, details of the feeding unit 5 being a main part of the scanner 1 of the present exemplary embodiment are described. As illustrated in FIG. 8, a set guide 57 is provided on the outer side of the feeding roller 51 in the width direction. Before feeding is started, the document is supported from below, is pushed up, and is separated from the feeding roller 51 by the set guide 57. In other words, the document is prevented from contacting with the feeding roller 51 before feeding is started.

Figure 4:
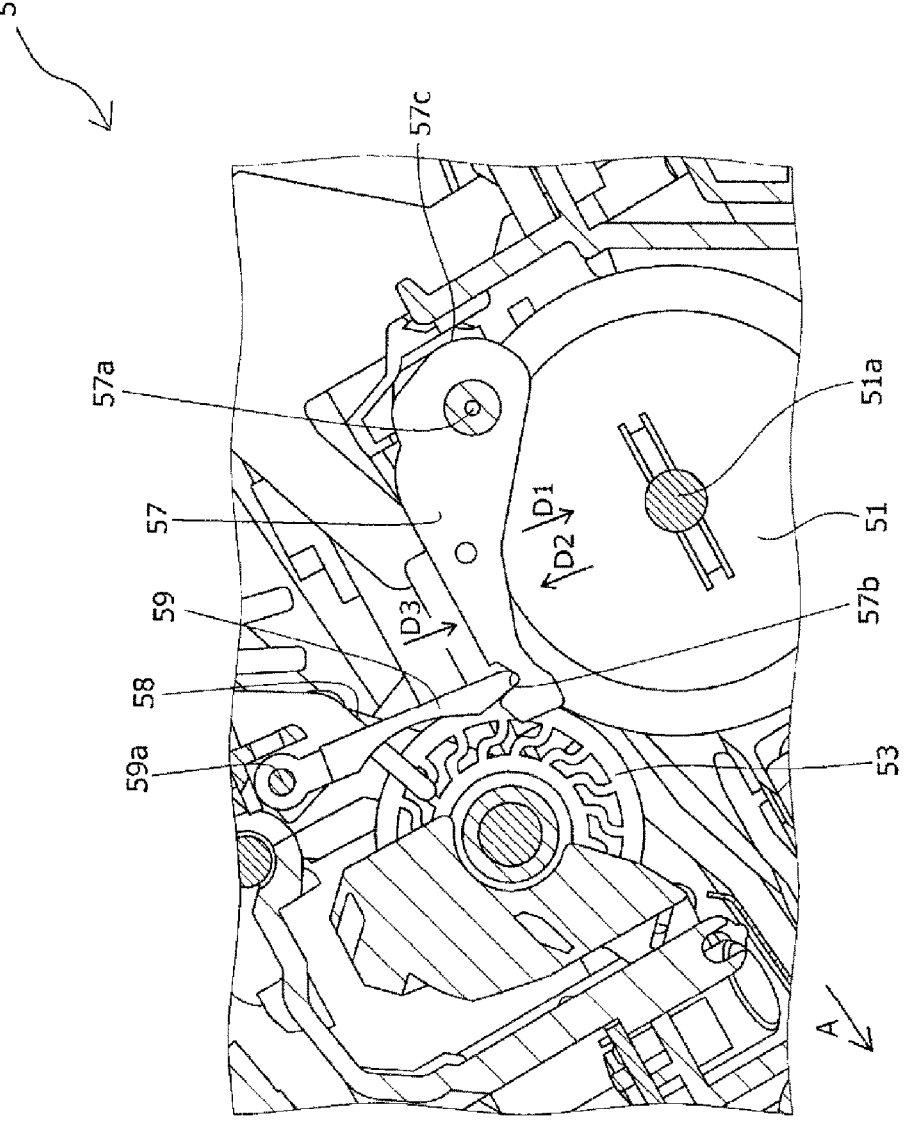
FIG. 4 is a side cross-sectional view illustrating the periphery of the feeding roller of the image reading apparatus in FIG. 1, and is a view illustrating a position of a first displacement member at the time of setting a medium.
Figure 5:
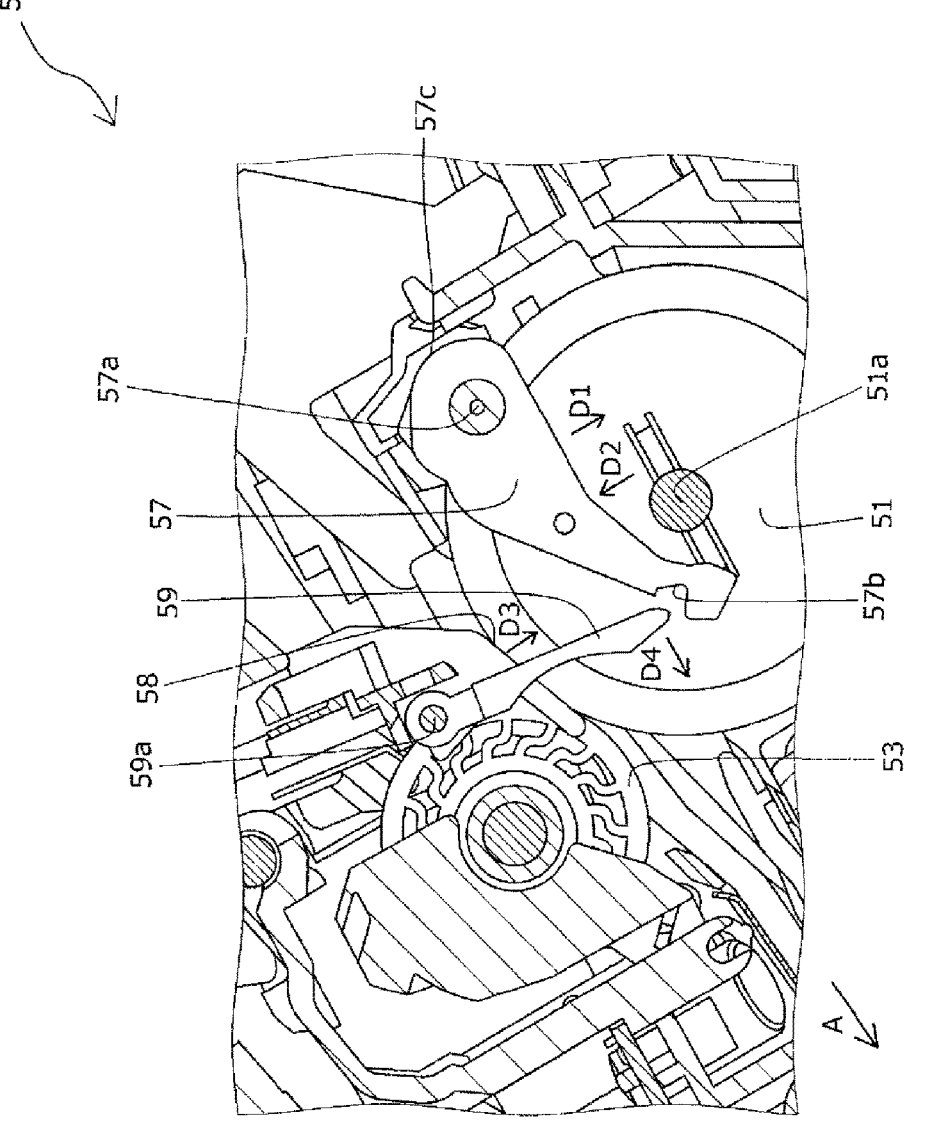
FIG. 5 is a side cross-sectional view illustrating the periphery of the feeding roller of the image reading apparatus in FIG. 1, and is a view illustrating a position of the first displacement member at the time of feeding the medium.
Figure 5:
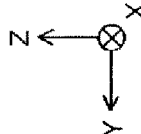

In the state before feeding is started as illustrated in FIG. 4, the leading edge of the document in the feeding direction A is held at a feeding standby position by a flap 59 being an abutment portion, and entry thereof between the feeding roller 51 and the separating roller 53 is regulated. Note that the flap 59 is mounted to be rotatable in a direction D4, which is illustrated in FIG. 5, with a rotary shaft 59$a$ provided to a pressing unit 58 as a reference. However, in a state before feeding is started as illustrated in FIG. 4, the distal end thereof is hooked on a recessed portion 57$b$ provided in the set guide 57, and rotation in the direction D4 is prevented in the state before feeding is started.

Further, at the time of feeding as illustrated in FIG. 5, the set guide 57 retracts downward in a direction D1 from the state before feeding is started as illustrated in FIG. 4, and the document contacts with the feeding roller 51. Further, the distal end of the flap 59 comes off from the recessed portion 57$b$, and the flap 59 is rotatable in the direction D4 with a rotary shaft 57$a$. Therefore, as the feeding roller 51 rotates, the document is fed downstream in the feeding direction A. Note that, in this state, when the plurality of documents are placed on the medium placement unit 4, only the lowermost document is fed downstream. The flap 59 rotates in the direction D4 by the document fed downstream to open the transport path of the document.

The pressing unit 58 is provided to advance and retract with respect the feeding roller 51, and is urged by an urging portion, which is omitted in illustration, in an advancement direction toward the feeding roller 51. Further, as described above, the set guide 57 is provided to rotate in the direction D4 with the rotary shaft 57$a$ as a reference, and is movable by a second motor 92 illustrated in FIG. 10 between a first non-contact position of advancing toward the transport path of the document, which is illustrated in FIG. 4, and a first contact position of retracting from the transport path, which is illustrated in FIG. 5. In other words, the set guide 57 being the first displacement member can be displaced between the first non-contact position and the first contact position. At the first non-contact position, the document placed on the medium placement unit 4 and the feeding roller 51 do not contact with each other in a feeding standby state in which the feeding roller 51 and the pick roller 52 stand by for feeding of the document. At the first contact position, the document placed on the medium placement unit 4 and the feeding roller 51 contact with each other in a feeding state in which the feeding roller 51 and the pick roller 52 feed the document. Note that the set guide 57 may be configured to be movable by a first motor 91 between the first non-contact position of advancing toward the transport path of the document, which is illustrated in FIG. 4, and the first contact position of retracting from the transport path, which is illustrated in FIG. 5.

Further, in the state illustrated in FIG. 4, there is maintained a state in which the pressing unit 58 is pushed up by the set guide 57 via the flap 59 against the urging portion, which is omitted in illustration, and is separated away from the feeding roller 51. In this state, even when the document is placed on the medium placement unit 4, the pressing unit 58 does not press the document. Further, in this state, the distal end of the flap 59 enters the recessed portion 57$b$ of the set guide 57. Thus, rotation of the flap 59 with the rotary shaft 59$a$ as a reference is regulated, and a blocking posture that blocks the transport path is maintained.

Meanwhile, in a state in which feeding of the document is started as illustrated in FIG. 5, the pressing unit 58 is configured to press the document in a direction D3. The set guide 57 is switched from the first non-contact position illustrated in FIG. 4 to the first contact position illustrated in FIG. 5, the pressing unit 58 presses the document, and the document contacts with the feeding roller 51.

Herein, as illustrated in FIG. 6 to FIG. 9, a contact suppressing member 10 is provided upstream of the set guide 57 in the feeding direction A. The contact suppressing member 10 is a constituent member that prevents contact between the document and the pick roller 52 in the feeding standby state of setting the document. Specifically, the contact suppressing member 10 is configured to rotate with a rotary shaft 10$a$ as a reference, and functions as the second displacement member that can be displaced between a second non-contact position and a second contact position. At the second non-contact position, the document placed on the medium placement unit 4 and the pick roller 52 do not contact with each other in the feeding standby state. At the second contact position, the document placed on the medium placement unit 4 and the pick roller 52 contact with each other in the feeding state.

Figure 6:
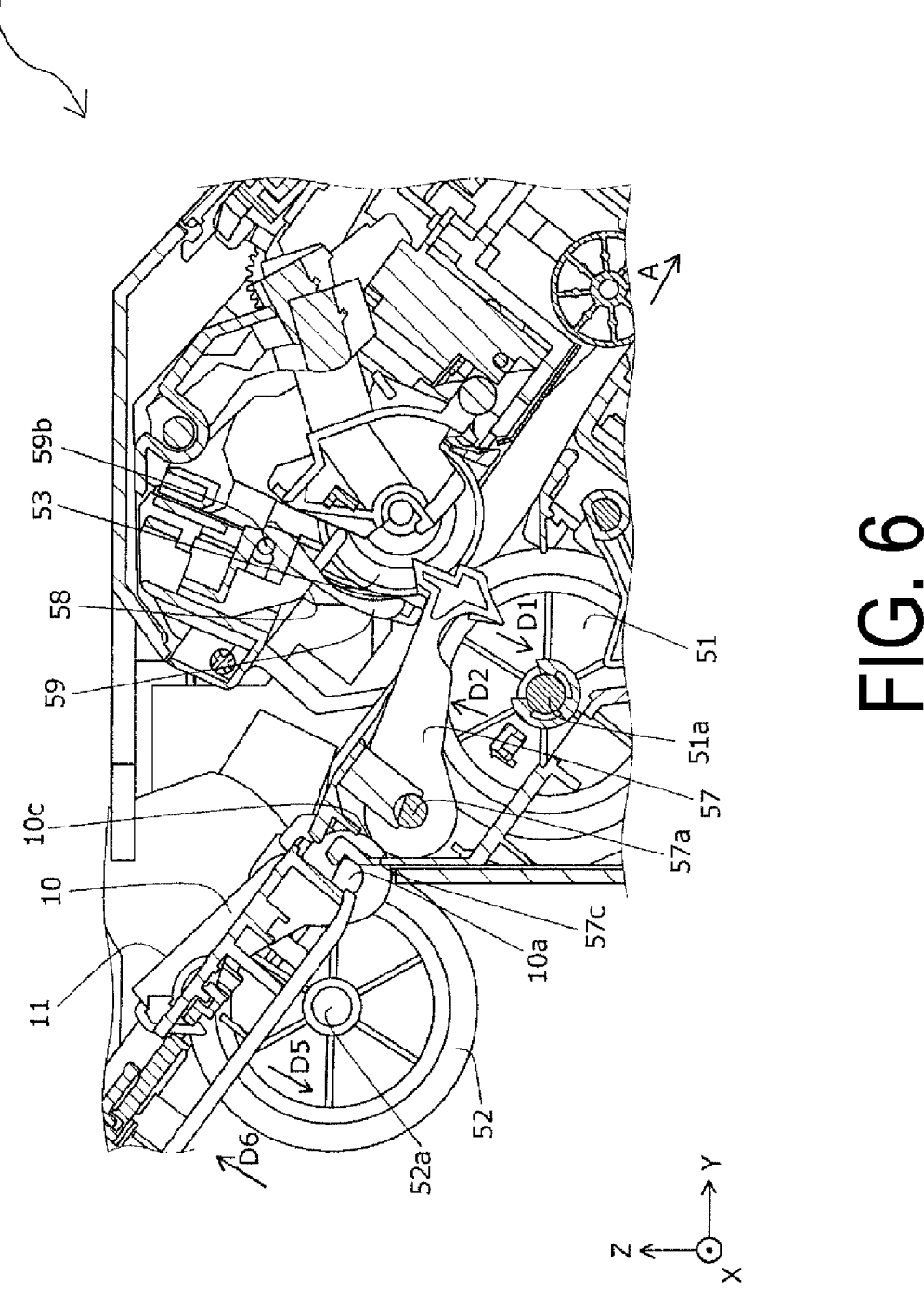
FIG. 6 is a side cross-sectional view illustrating a periphery of the first displacement member and a second displacement member of the image reading apparatus in FIG. 1, and is a view illustrating positions of positions of the first displacement member and the second displacement member at the time of setting the medium.
Figure 7:
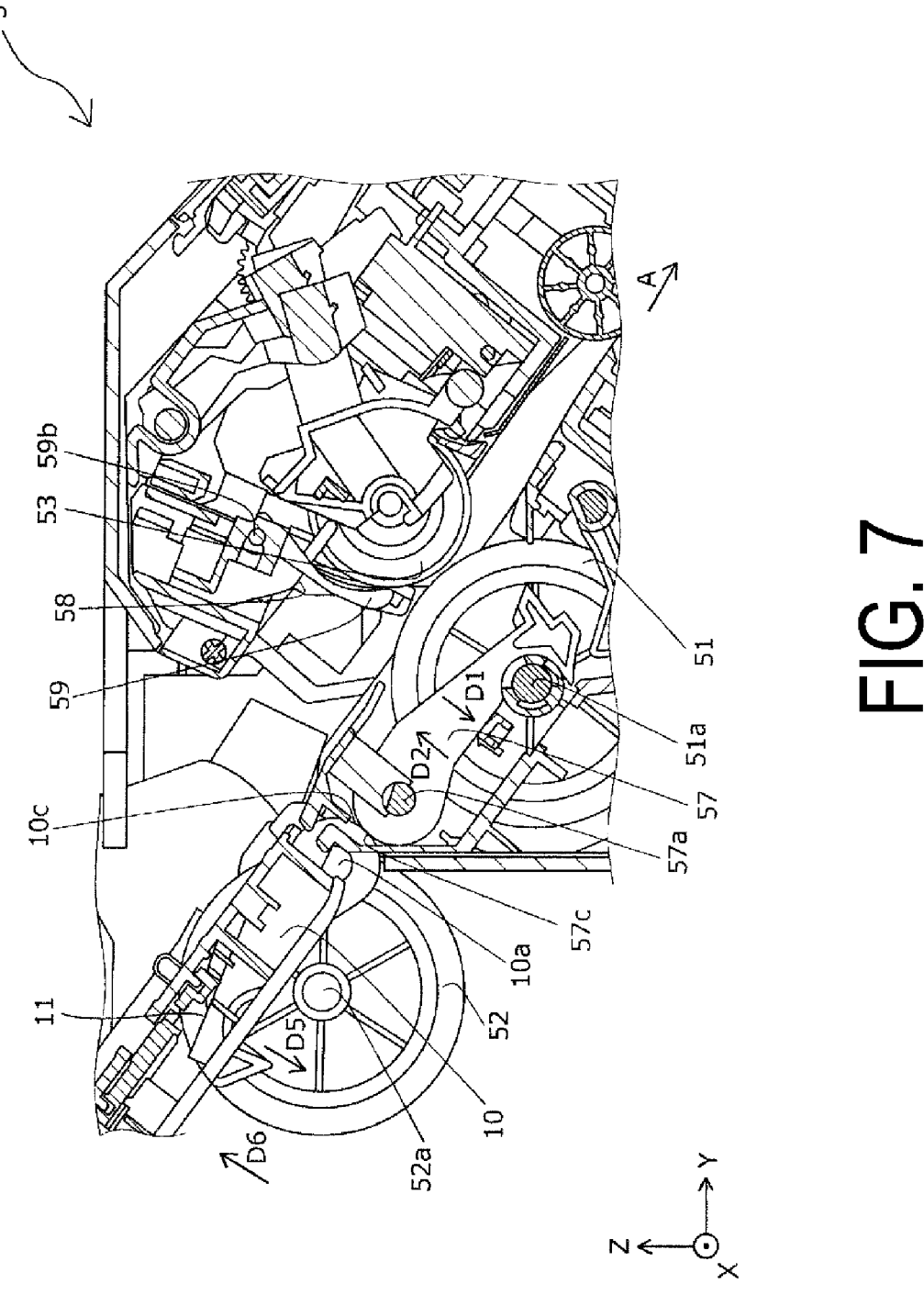
FIG. 7 is a side cross-sectional view illustrating the periphery of the first displacement member and the second displacement member of the image reading apparatus in FIG. 1, and is a view illustrating positions of the first displacement member and the second displacement member at the time of feeding the medium.

A downstream surface 57$c$ of the set guide 57 in the feeding direction A and an upstream surface 10$c$ of the contact suppressing member 10 in the feeding direction A contact with each other, and recesses and protrusions formed on each of the downstream surface 57$c$ and the upstream surface 10$c$ are fitted to each other. Thus, as illustrated in FIG. 6 and FIG. 7, when the set guide 57 rotates to move in the direction D1 with the rotary shaft 57a as a reference, the contact suppressing member 10 rotates to move in a direction D5 with the rotary shaft 10a as a reference. When the set guide 57 rotates to move in a direction D2 opposite to the direction D1 with the rotary shaft 57a as a reference, the contact suppressing member 10 rotates to move in a direction D6 opposite to the direction D5 with the rotary shaft 10a as a reference. In other words, in the feeding standby state, the set guide 57 prevents contact between the document and the feeding roller 51, and the contact suppressing member 10 prevents contact between the document and the pick roller 52. Meanwhile, in the feeding state, the set guide 57 causes the document and the feeding roller 51 to contact with each other, and the contact suppressing member 10 causes the document and the pick roller 52 to contact with each other.

In other words for the above-mentioned matter, the contact suppressing member 10 being the second displacement member is displaced from the second non-contact position to the second contact position as the set guide 57 being the first displacement member is displaced from the first non-contact position to the first contact position, and is displaced from the second contact position to the second non-contact position as the set guide 57 is displaced from the first contact position to the first non-contact position. In other words, contact between the document and the pick roller 52 is prevented in the feeding standby state of setting the document, and contact between the document and the pick roller 52 is allowed in the feeding state of reading an image on the document. Thus, the scanner 1 of the present exemplary embodiment includes the pick roller 52 being the auxiliary feeding roller, and hence feeding performance is improved. At the same time, the document and the pick roller 52 do not contact with each other in the feeding standby state of setting the document, and hence setting performance of the document can be improved.

Further, in other words for the above-mentioned matter, the pick roller 52 and the contact suppressing member 10 form an auxiliary feeding roller that is provided upstream of the feeding roller 51 in the feeding direction A, and feeds the document with the feeding roller 51. Further, as the set guide 57 is displaced from the first non-contact position to the first contact position, the contact suppressing member 10 is displaced from the second non-contact position to the second contact position, and the document placed on the medium placement unit 4 and the pick roller 52 contact with each other. As the set guide 57 is displaced from the first contact position to the first non-contact position, the contact suppressing member 10 is displaced from the second contact position to the second non-contact position, and the pick roller 52 does not contact with the document placed on the medium placement unit 4. With this configuration, as the feeding state of reading an image on the document is started, in other words, as the set guide 57 is displaced from the first contact position to the first non-contact position, the contact suppressing member 10 is displaced to feed a document feeding force to the pick roller 52.

Figure 9:
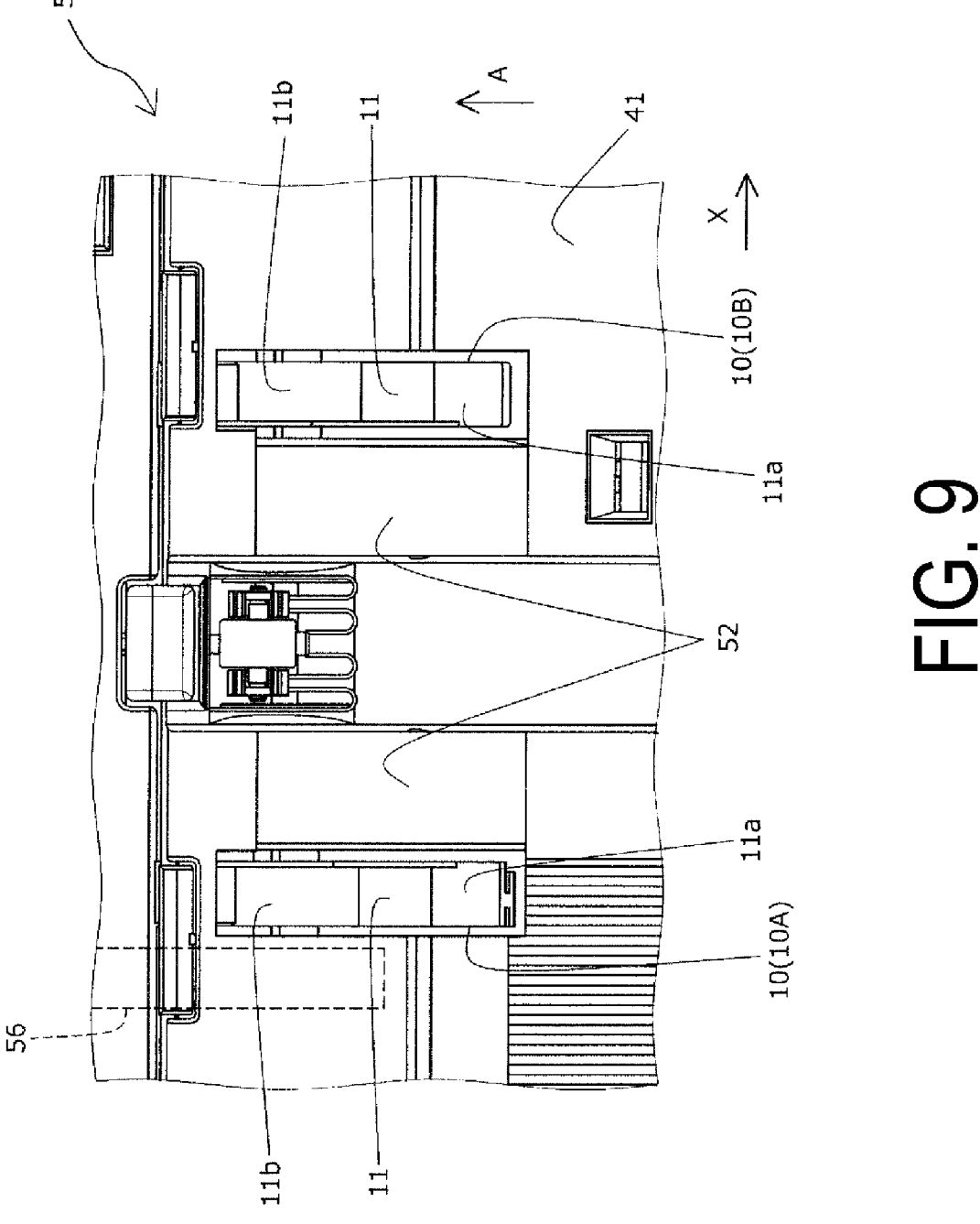
FIG. 9 is a plan view illustrating the periphery of the auxiliary feeding roller and the second displacement member of the image reading apparatus in FIG. 1.

Herein, as illustrated in FIG. 8 and FIG. 9, the scanner 1 of the present exemplary embodiment includes a first moving portion 10A and a second moving portion 10B, as the contact suppressing member 10. Further, the pick roller 52 is provided between the first moving portion 10A and the second moving portion 10B in the width direction intersecting with the feeding direction A. Further, as illustrated in FIG. 8, when the contact suppressing member 10 is at the second non-contact position, the first moving portion 10A and the second moving portion 10B protrudes from the placement surface 41 of the medium placement unit 4 with respect to the pick roller 52. With this configuration, when the contact suppressing member 10 is at the second non-contact position, the document can effectively be prevented from contacting with the pick roller 52.

Note that, in the present exemplary embodiment, as illustrated in FIG. 8, when the contact suppressing member 10 is at the second non-contact position, the entirety of the first moving portion 10A and the second moving portion 10B protrudes from the placement surface 41 of the medium placement unit 4 with respect to the pick roller 52, and there is no region in which the pick roller 52 protrudes from the placement surface 41 of the medium placement unit 4 with respect to the first moving portion 10A and the second moving portion 10B. However, the first moving portion 10A and the second moving portion 10B are not limited to such a configuration. There may be adopted a configuration in which, when the contact suppressing member 10 is at the second non-contact position, a part of the first moving portion 10A and the second moving portion 10B, for example, the most protruding part thereof protrudes from the placement surface 41 of the medium placement unit 4 with respect to the pick roller 52.

Further, as illustrated in FIG. 8 and FIG. 9, the first moving portion 10A and the second moving portion 10B are provided with inclination surfaces 11 upstream and downstream thereof in the feeding direction A, and a downstream inclination surface 11b of the inclination surfaces that is provided downstream in the feeding direction A is longer than an upstream inclination surface 11A of the inclination surfaces that is provided upstream in the feeding direction A. At the time of setting the document, the document can be guided along the downstream inclination surface 11b. Thus, the document can be guided suitably along the long downstream inclination surface 11b.

Further, as described above, the scanner 1 of the present exemplary embodiment includes the gear train 56. As illustrated in FIG. 3, the gear train 56 is provided between the first gear 54 and the second gear 55 in the feeding direction A. As indicated with the broken line in FIG. 9, the gear train 56 is provided on the −X direction side being opposite to the pick roller 52 in the width direction intersecting with the feeding direction A with the first moving portion 10A of the contact suppressing member 10 as a reference. The gear train 56 is arranged as described above. Thus, the gear train 56 can efficiently be arranged in the apparatus, and size increase of the apparatus can be suppressed.

Herein, in the scanner 1 of the present exemplary embodiment, the pick roller 52 has elasticity higher than that of the feeding roller 51. Specifically, in the scanner 1 of the present exemplary embodiment, the surface material of the pick roller 52 is softer than the surface material of the feeding roller 51. With this configuration, the pick roller 52 contacts with the document in a contact area that is wider and softer than the feeding roller 51 to feed the document. Thus, feeding performance of the document can particularly be improved. In the present exemplary embodiment, the pick roller 52 is softer and deformed more easily than the feeding roller 51. Thus, the protrusion amount of the pick roller 52 at the second non-contact position from the placement surface 41 is larger than the protrusion amount of the feeding roller 51 at the first non-contact position from the placement surface 41. Note that, in the present exemplary embodiment, the surface material of the pick roller 52 is a material softer than the surface material of the feeding roller 51. However, the surface material of the pick roller 52 may be the same as the surface material of the feeding roller 51, and the constitutive density of the surface material of the pick roller 52 may be lower than the constitutive density of the surface material of the feeding roller 51. With this, the pick roller 52 may have elasticity higher than that of the feeding roller 51.

Further, as described above, the scanner 1 of the present exemplary embodiment includes the separating roller 53, the separating roller 53 also has elasticity higher than that of the feeding higher than that of the feeding roller 51. Thus, in the scanner 1 of the present exemplary embodiment, when the plurality of documents are placed on the medium placement unit 4, one document can be separated at a high accuracy. Note that, in the present exemplary embodiment, the separating roller 53 and the pick roller 52 have equivalent elasticity that is higher than elasticity of the feeding roller 51. Meanwhile, each of the rollers forming the transport roller pairs 6 and 7 have elasticity lower than that of the feeding roller 51. With this configuration, feeding and transport of the document are performed at a particularly high accuracy. However, the present disclosure is not limited to such a configuration. Note that elasticity of each of the rollers described above specifically indicates elasticity relating to the surface material thereof.

Figure 10:
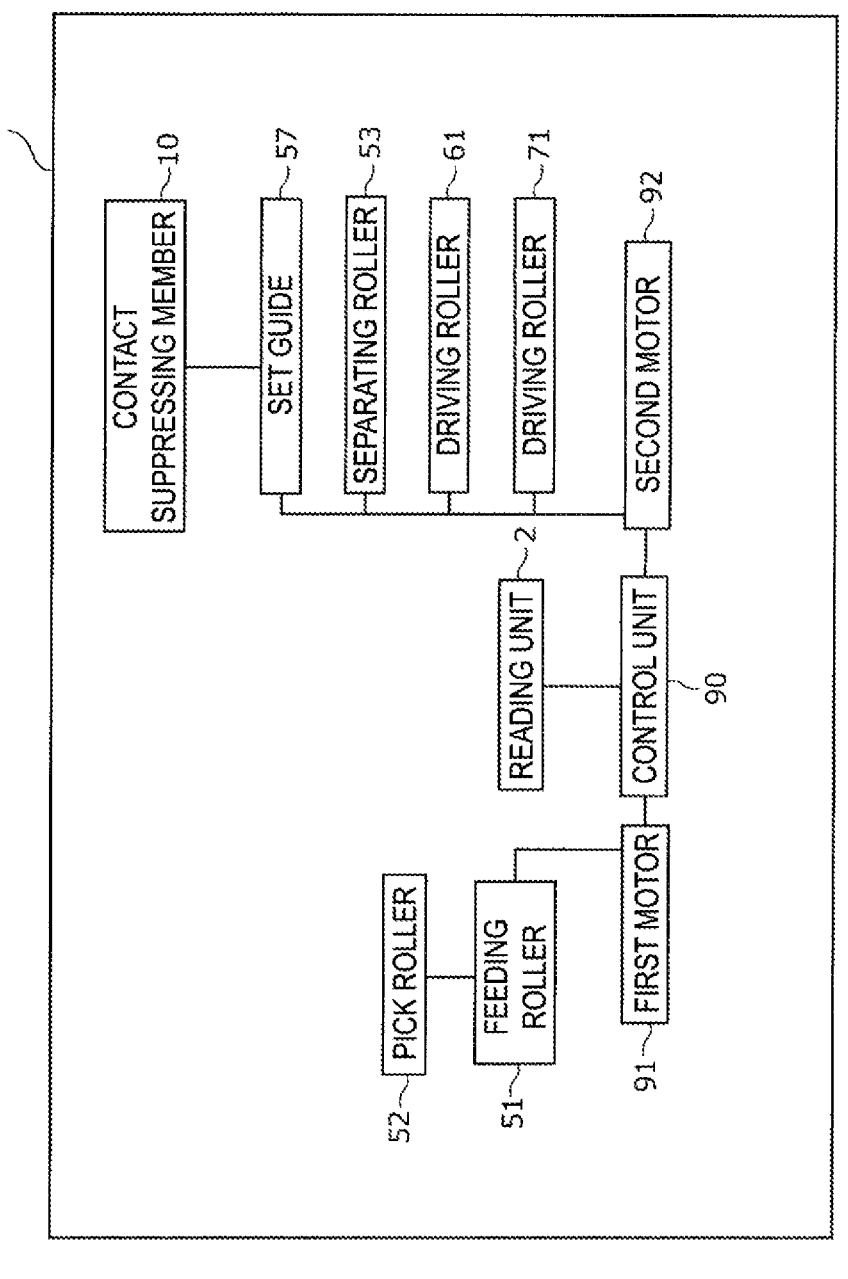
FIG. 10 is a block diagram of the image reading apparatus in FIG. 1.

Herein, an electric configuration and the like of the scanner 1 of the present exemplary embodiment are described with reference to FIG. 10. As illustrated in FIG. 10, the scanner 1 of the present exemplary embodiment includes a control unit 90. The control unit 90 includes a CPU, a storage unit including a ROM and a RAM, and the like. Further, the control unit 90 is coupled to the reading unit 2, and is coupled to the first motor 91 and the second motor 92 each of which is a DC motor. The first motor 91 is capable of driving the feeding roller 51 and driving the pick roller 52 coupled via the gear train 56 by driving the feeding roller 51. Further, the second motor 92 is capable of driving the set guide 57, the separating roller 53, the driving roller 61, and the driving roller 71 and driving the contact suppressing member 10 meshed with the set guide 57 by driving the set guide 57.

Herein, the scanner 1 of the present exemplary embodiment is configured such that the feeding speed at which the pick roller 52 feeds the document is lower than the feeding speed at which the feeding roller 51 feeds the document. Thus, in the scanner 1 of the present exemplary embodiment, the document can be fed in a state in which the document is pulled in the feeding direction A, and feeding performance of the document can particularly be improved. Moreover, with this configuration, a larger number of documents and a document having a larger size can be transported. Note that, in the present exemplary embodiment, the feeding speed at which the pick roller 52 feeds the document is configured to be lower than the feeding speed at which the feeding roller 51 feeds the document by changing a gear ratio between the first gear 54 and the second gear 55, but the method is not limited thereto.

Further, in the scanner 1 of the present exemplary embodiment, when the control unit 90 controls to stop feeding of the document by the feeding roller 51 and the pick roller 52, the feeding roller 51 and the pick roller 52 rotate, the set guide 57 is displaced from the first non-contact position to the first contact position, and the contact suppressing member 10 is displaced from the second non-contact position to the second contact position. For example, this corresponds to the displacement from the state in FIG. 6 to the state in FIG. 7. With this configuration, soon after feeding of the document is started, a document feeding force can be applied to the feeding roller 51 and the pick roller 52.

Further, in the scanner 1 of the present exemplary embodiment, when the control unit 90 controls to stop feeding of the document by the feeding roller 51 and the pick roller 52, the set guide 57 is displaced from the first contact position to the first non-contact position, the contact suppressing member 10 is displaced from the second contact position to the second non-contact position, and the feeding roller 51 and the pick roller 52 stop rotating. For example, this corresponds to the displacement from the state in FIG. 7 to the state in FIG. 6. With this configuration, when the subsequent document is fed, a start operation of feeding the document can be performed soon.

Further, the scanner 1 of the present exemplary embodiment includes the transport roller pair 6 that is provided downstream of the feeding roller 51 in the feeding direction A and transports the document fed by the feeding roller 51 in the reading unit 2. A driving force from the second motor 92 being a driving source rotates only one of the rollers forming the transport roller pair 6 as the driving roller 61. However, the present disclosure is not limited to such a configuration. The driving force from the driving source may rotate the two rollers together that form the transport roller pair 6 and face each other. The driving force from the driving source rotate the two rollers together that form the transport roller pair 6 and face each other. With this configuration, in a case of transporting a thick medium such as a booklet that requires a large transport force, the transport force can be increased more than that in a configuration in which the driving force from the driving source rotates only one of the two rollers that form the transport roller pair 6 and face each other.

However, among the various rollers, a roller to be driven by the driving source is not particularly limited. For example, one driving source may be provided, and the driving source may rotate the feeding roller 51, the pick roller 52, the rollers corresponding to the positions of the driving roller 61 and the driving roller 71, and the rollers corresponding to the positions of the driven roller 62 and the driven roller 72. Further, two driving source may be provided, a first driving source may rotate the feeding roller 51 and the pick roller 52, and a second driving source may rotate the rollers corresponding to the positions of the driving roller 61 and the driving roller 71 and the rollers corresponding to the positions of the driven roller 62 and the driven roller 72. Further, three driving sources may be provided, the first driving source may rotate the feeding roller 51, the second driving source may rotate the pick roller 52, and a third driving source may rotate the rollers corresponding to the positions of the driving roller 61 and the driving roller 71 and the rollers corresponding to the positions of the driven roller 62 and the driven roller 72.

Further, for example, one driving source may be provided, the driving source may rotate the feeding roller 51, the pick roller 52, and the rollers corresponding to the positions of the driving roller 61 and the driving roller 71, and the rollers corresponding to the positions of the driven roller 62 and the driven roller 72 may be driven to rotate. Further, two driving sources may be provided, the first driving source may rotate the feeding roller 51 and the pick roller 52. The second driving source may rotate the rollers corresponding to the positions of the driving roller 61 and the driving roller 71, and the rollers corresponding to the positions of the driven roller 62 and the driven roller 72 may be driven to rotate. Further, three driving sources may be provided, the first driving source may rotate the feeding roller 51, and the second driving source may rotate the pick roller 52. The third driving source may rotate the rollers corresponding to the positions of the driving roller 61 and the driving roller 71, and the rollers corresponding to the positions of the driven roller 62 and the driven roller 72 may be driven to rotate.

Second Exemplary Embodiment

A scanner of a second exemplary embodiment is described below with reference to FIG. 11 and FIG. 12. The scanner of the present exemplary embodiment is similar to the scanner 1 of the first exemplary embodiment, except for the configuration described below. Specifically, only the difference from the scanner 1 of the exemplary embodiment 1 is that, as the second displacement member, the contact suppressing member 15 is provided in place of the contact suppressing member 10. Thus, the scanner of the present exemplary embodiment has features similar to those of the scanner 1 of the first exemplary embodiment, except for the matters described below. Thus, in FIG. 11 and FIG. 12, the constituent members that are commonly shared in the first exemplary embodiment described above are denoted with the same reference symbols, and detailed description thereof is omitted.

As illustrated in FIG. 6, FIG. 7, and the like, the contact suppressing member 10 is provided as the second displacement member in the scanner 1 of the first exemplary embodiment. Meanwhile, as illustrated in FIG. 11 and FIG. 12, the scanner of the present exemplary embodiment is provided with the contact suppressing member 15 as the second displacement member. The contact suppressing member 15 has a C-like shape, and is arranged to cover the pick roller 52 as viewed in the width direction. Further, the downstream surface 57c of the set guide 57 in the feeding direction A and an upstream surface 15c of the contact suppressing member 15 in the feeding direction A contact with each other, and recesses and protrusions formed on each of the downstream surface 57c and the upstream surface 15c are fitted to each other. Thus, as illustrated in FIG. 11 and FIG. 12, when the set guide 57 rotates to move in the direction D1 with the rotary shaft 57a as a reference, the contact suppressing member 15 rotates to move in a direction D7 with a rotary shaft 52a of the pick roller 52 as a reference. When the set guide 57 rotates to move in the direction D2 with the rotary shaft 57a as a reference, the contact suppressing member 15 rotates to move in a direction D8 opposite to the direction D7 with the rotary shaft 52a as a reference.

Figure 11:
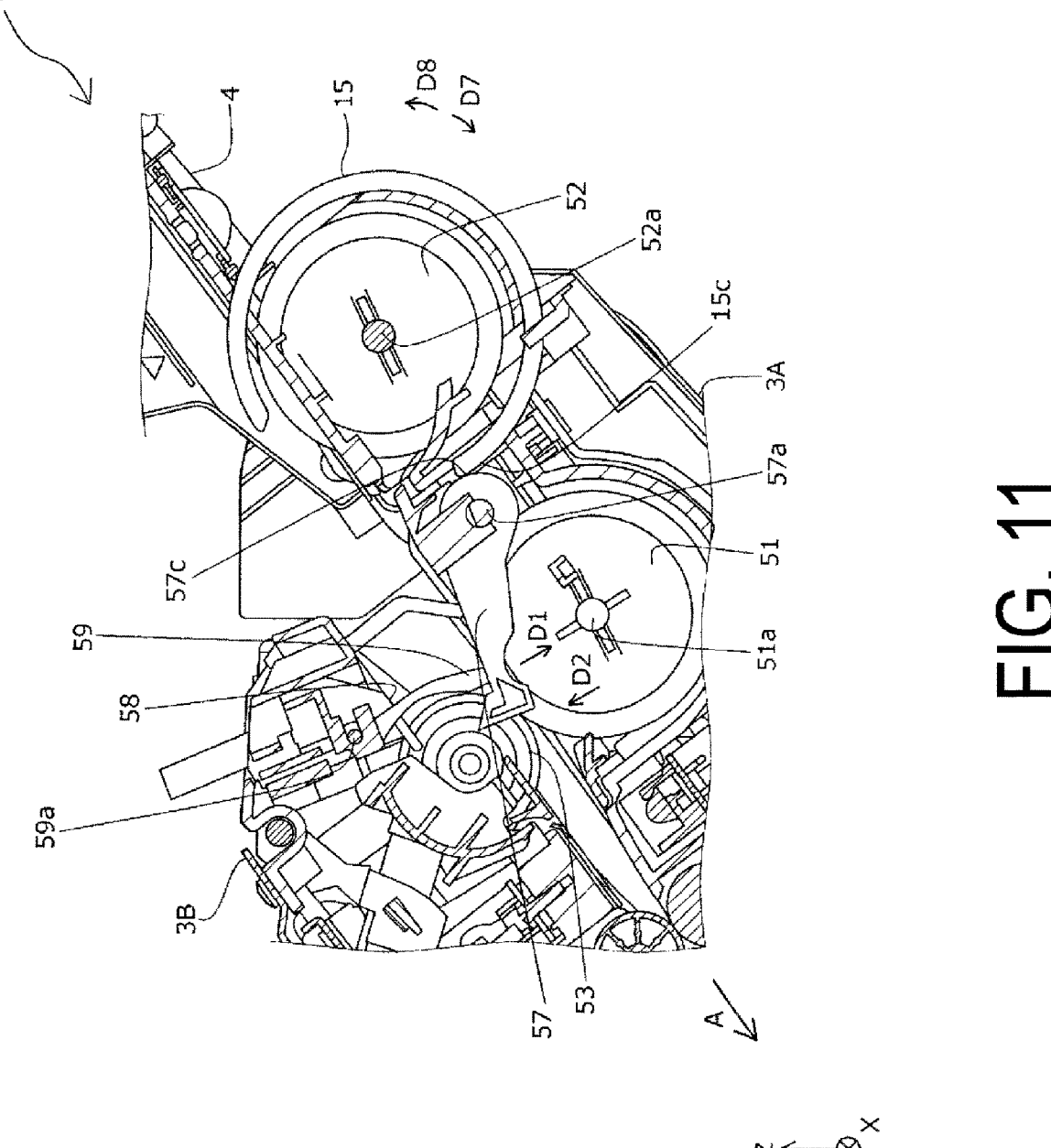
FIG. 11 is a side cross-sectional view illustrating a periphery of a first displacement member and a second displacement member of an image reading apparatus according to a second exemplary embodiment of the present disclosure, and is a view illustrating positions of the first displacement member and the second displacement member at the time of setting a medium.
Figure 12:
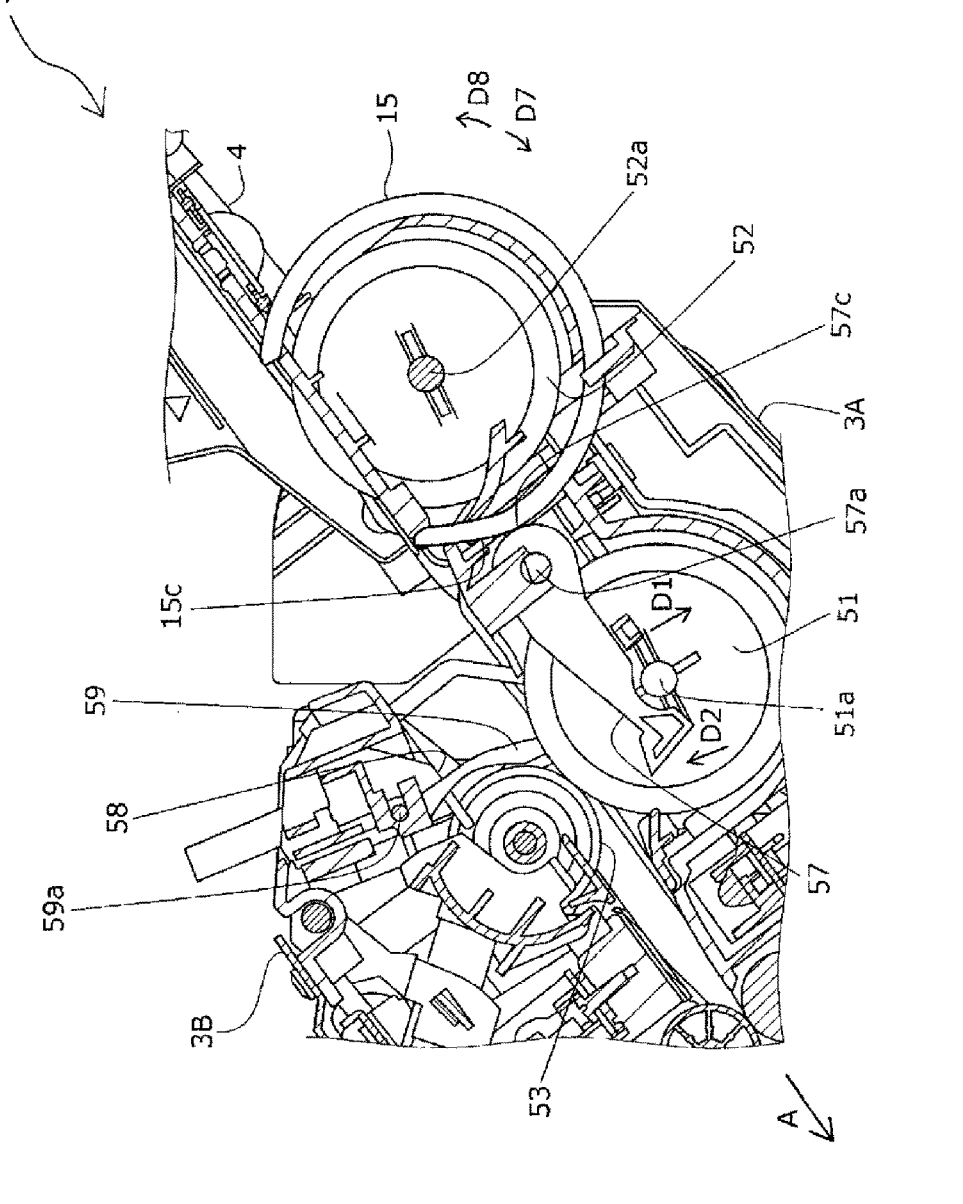
FIG. 12 is a side cross-sectional view illustrating the periphery of the first displacement member and the second displacement member of the image reading apparatus in FIG. 11, and is a view illustrating positions of the first displacement member and the second displacement member at the time of feeding the medium.
Figure 12:
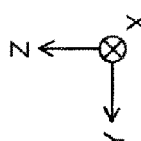

Specifically, in the state illustrated in FIG. 11, the contact suppressing member 15 covers the pick roller 52. Further, when the set guide 57 rotates to move in the direction D1 with the rotary shaft 57a as a reference, and is shifted from the state illustrated in FIG. 11 to the state illustrated in FIG. 12, the contact suppressing member 15 rotes to move in the direction D7 with the rotary shaft 52a of the pick roller 52 as a reference, and the contact suppressing member 15 opens the side of the pick roller 52 on which the pick roller 52 contacts with the document. Meanwhile, when the set guide 57 rotates to move in the direction D2 with the rotary shaft 57a as a reference, and is shifter from the state illustrated in FIG. 12 to the state illustrated in FIG. 11, the contact suppressing member 15 rotates to move in the direction D8 with the rotary shaft 52a of the pick roller 52 as a reference, and the contact suppressing member 15 covers the side of the pick roller 52 on which the pick roller 52 contacts with the document. In other words, in the scanner 1 of the present exemplary embodiment, in the feeding standby state, the set guide 57 prevents contact between the document and the feeding roller 51, and the contact suppressing member 15 prevents contact between the document and the pick roller 52. Further, in the scanner 1 of the present exemplary embodiment, in the feeding state, the set guide 57 causes the document and the feeding roller 51 to contact with each other, and the contact suppressing member 15 causes the document and the pick roller 52 to contact with each other.

Third Exemplary Embodiment

Figure 13:
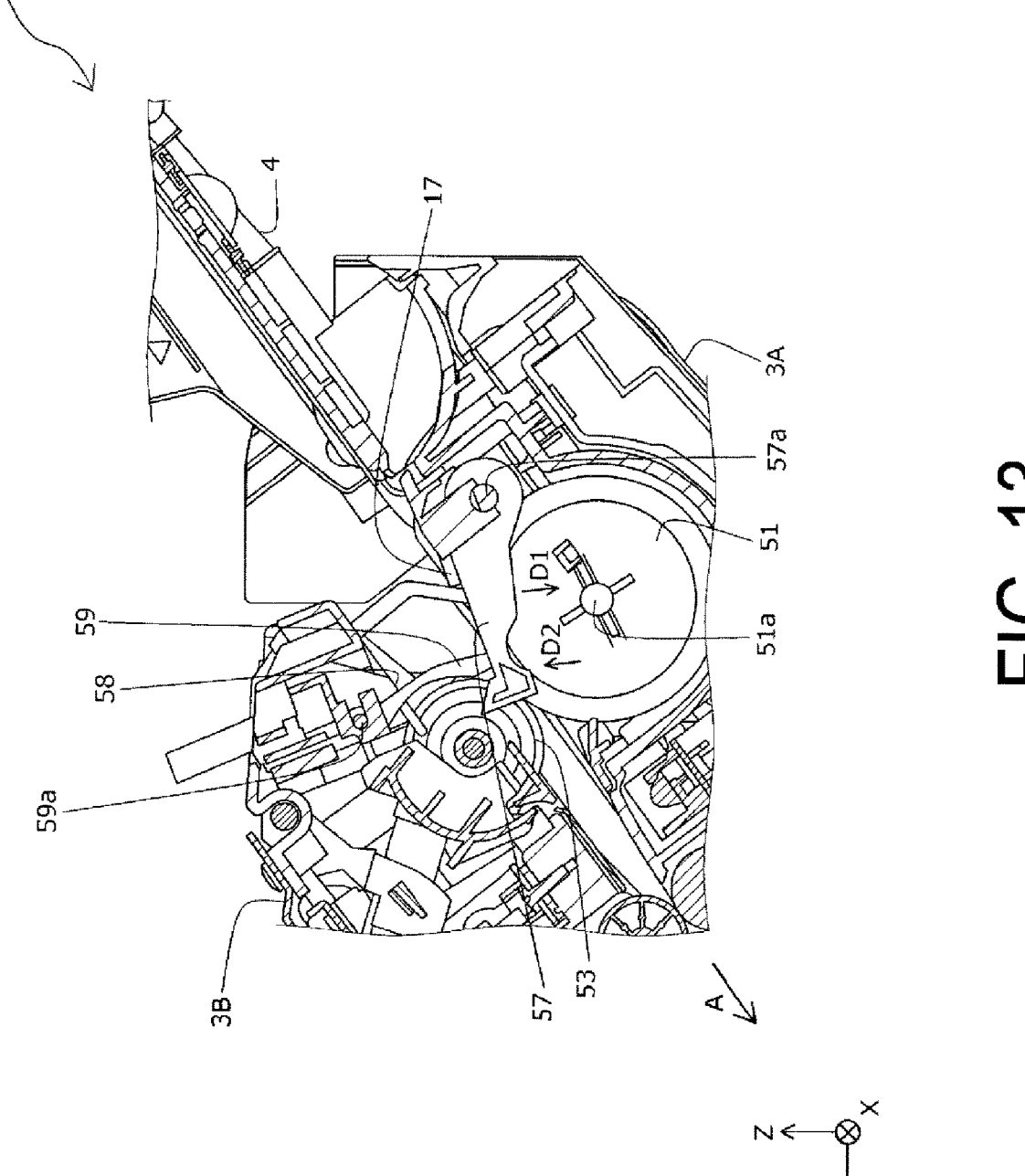
FIG. 13 is a side cross-sectional view illustrating a periphery of a first displacement member and a second displacement member of an image reading apparatus according to a third exemplary embodiment of the present disclosure, and is a view illustrating positions of the first displacement member and the second displacement member at the time of setting a medium.
Figure 14:
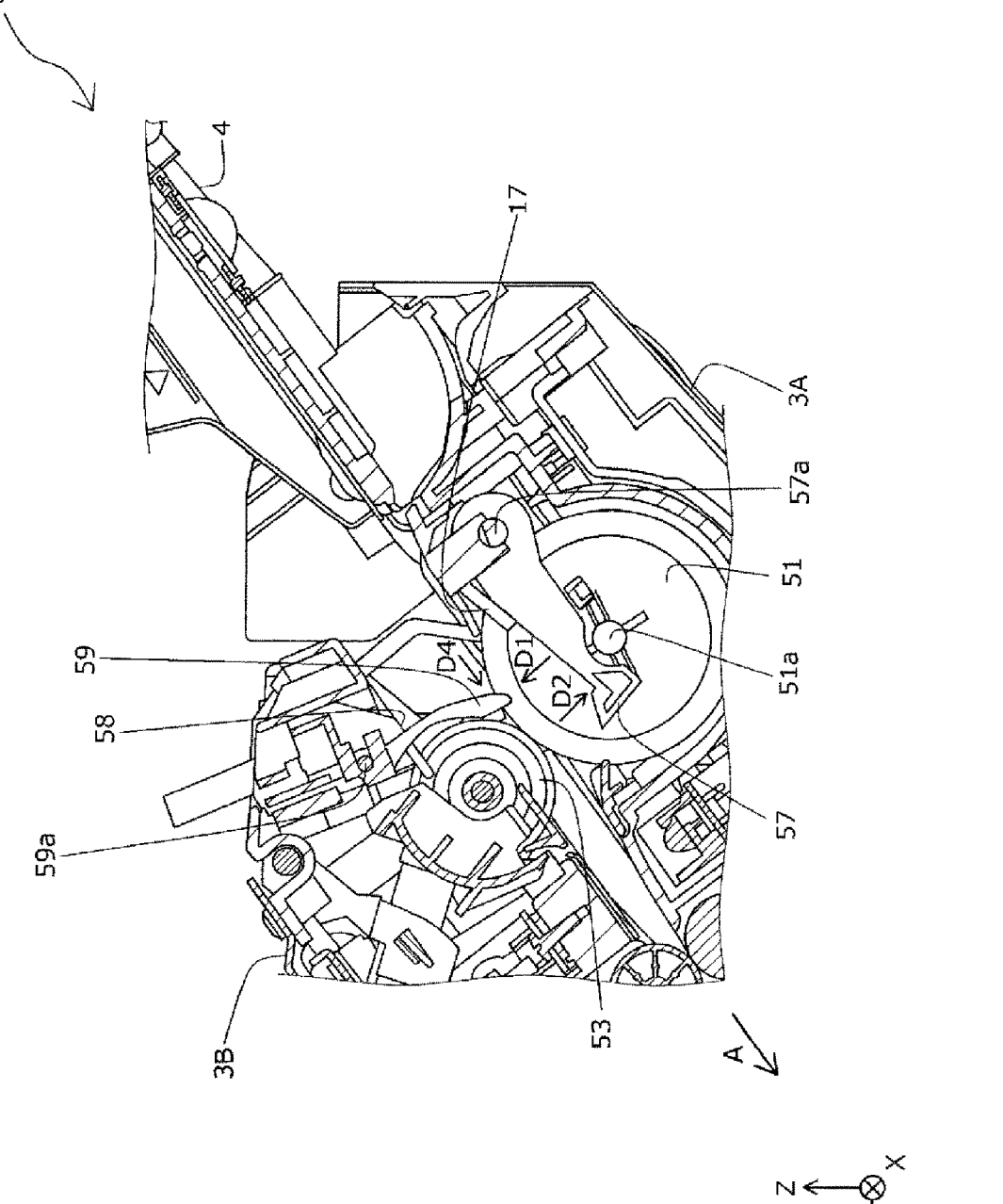
FIG. 14 is a side cross-sectional view illustrating the periphery of the first displacement member and the second displacement member of the image reading apparatus in FIG. 13, and is a view illustrating positions of the first displacement member and the second displacement member at the time of feeding the medium.
Figure 15:
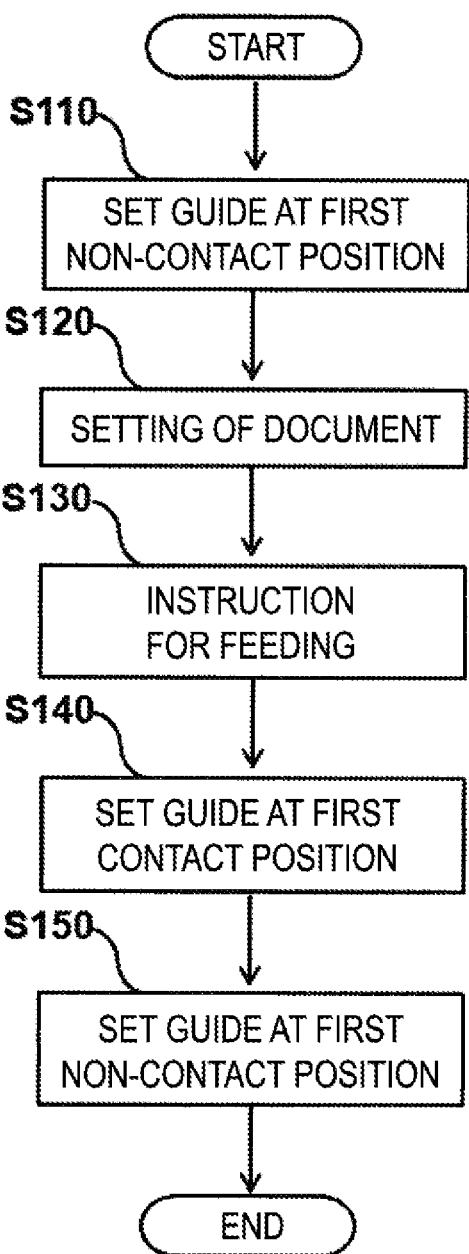
FIG. 15 is a flowchart illustrating an operation from setting of a document to a start of feeding of the document, which is performed by using the image reading apparatus in FIG. 13.

With reference to FIG. 13 to FIG. 15, a scanner of a third exemplary embodiment is described below. The scanner of the present exemplary embodiment is similar to the scanners of the first exemplary embodiment and the second exemplary embodiment, except for the configuration described below. Specifically, for example, the scanner of the present exemplary embodiment is different from the scanners of the first exemplary embodiment and the second exemplary embodiment in that the set guide 57 is provided with an elastic member 17 as the auxiliary feeding member without including the pick roller as the auxiliary feeding roller, and the contact suppressing member 10 and the contact suppressing member 15 as the second displacement members. The scanner of the present exemplary embodiment has features similar to those of the scanners of the first exemplary embodiment and the second exemplary embodiment, except for the matters described below. Thus, in FIG. 13 and FIG. 14, the constituent members that are commonly shared in the first exemplary embodiment and the second exemplary embodiment described above are denoted with the same reference symbols, and detailed description thereof is omitted.

As illustrated in FIG. 13 and FIG. 14, in the scanner of the present exemplary embodiment, the set guide 57 is provided with the elastic member 17 as the auxiliary feeding member. The elastic member 17 contacts with the document to generate a frictional force therebetween with the document. Further, the elastic member 17 is shifted from the state of contacting with the document due to the set guide 57 at the first contact position illustrated in FIG. 13 to the state of not contacting with the document due to the set guide 57 at the first non-contact position illustrated in FIG. 14. With this, the elastic member 17 applies the transport force in the feeding direction A to the document, and assists feeding of the document.

Herein, with reference to FIG. 15, description is made on a specific operation from setting of the document to a start of feeding of the document in the scanner of the present exemplary embodiment. First, in Step S110, the set guide 57 is placed at the first non-contact position at which the document placed on the medium placement unit 4 and the feeding roller 51 do not contact with each other, as illustrated in FIG. 14. In this state, the elastic member 17 is t the position of not contacting with the document placed on the medium placement unit 4. Note that the scanner of the present exemplary embodiment includes a regulation unit capable of regulating rotation of the flap 59, which is omitted in illustration, and the flap 59 is prevented from rotating in the direction D4 in this step.

Next, in Step S120, a user sets the document on the medium placement unit 4. Further, in Step S130, a user inputs a feeding instruction to the control unit 90 through an operation unit, which is omitted in illustration. With this, in Step S140, the set guide 57 temporarily moves to the first contact position at which the document placed on the medium placement unit 4 and the feeding roller 51 contact with each other, as illustrated in FIG. 13. In this state, the elastic member 17 contacts with the document placed on the medium placement unit 4.

Further, after that, as the feeding roller 51 rotates, the set guide 57 moves to the first non-contact position again in Step S150. With this, the elastic member 17 assists feeding of the document. In this state, the state as illustrated in FIG. 14 is obtained again. Note that, in this state, the regulation unit, which is omitted in illustration, cancels regulation of rotation of the flap 59, and the flap 59 is rotatable in the direction D4.

In this manner, the scanner of the present exemplary embodiment includes the elastic member 17 as the auxiliary feeding member that is provided upstream of the feeding roller 51 in the feeding direction A and feeds the document with the feeding roller 51. Further, as the set guide 57 is displaced from the first non-contact position to the first contact position, the elastic member 17 contacts with the document placed on the medium placement unit 4. As the set guide 57 is displaced from the first contact position to the first non-contact position, the elastic member 17 does not contact with the document placed on the medium placement unit 4. With this configuration, in the scanner of the present exemplary embodiment, as the feeding state of reading an image on the document is started, in other words, the set guide 57 is displaced from the first contact position to the first non-contact position, the elastic member 17 is capable of applying a feeding force to the document. Similarly to the scanner of the present exemplary embodiment, various configurations other than, for example, the roller are used as the auxiliary feeding member. With this, arrangement and a size thereof have a higher degree of freedom. Thus, the auxiliary feeding member can be prevented from contacting with the document at the time of setting the document, and hence setting performance of the document can be improved.

The present disclosure is not intended to be limited to the aforementioned exemplary embodiments, and many variations are possible within the scope of the present disclosure as described in the appended claims. It goes without saying that such variations also fall within the scope of the present disclosure.

The exemplary embodiments described above are also applicable to a medium feeding device that does not include the reading unit. In the exemplary embodiments described above, the example in which the present disclosure is applied to an image reading apparatus represented by a scanner is described, but the present disclosure is also applicable to a recording apparatus represented by a printer, for example. That is, the same effects as those of the exemplary embodiments described above can be obtained in the recording apparatus using the document as a recording medium and using the reading unit as a recording unit that performs recording on the recording medium in the exemplary embodiments described above. An example of the recording apparatus may be an ink jet printer, and an example of the recording unit may be an ink jet recording head.

What is claimed is:

1. An image reading apparatus, comprising:
a reading unit configured to read an image on a medium;
a medium placement unit on which the medium is placed;
a feeding roller configured to feed the medium placed on the medium placement unit in a feeding direction;
an auxiliary feeding roller being provided upstream of the feeding roller in the feeding direction and being configured to feed the medium with the feeding roller;

a first displacement member configured to be displaced between a first non-contact position and a first contact position, the first non-contact position being a position at which the medium placed on the medium placement unit and the feeding roller do not contact with each other in a feeding standby state in which the feeding roller and the auxiliary feeding roller stand by for feeding of the medium, the first contact position being a position at which the medium placed on the medium placement unit and the feeding roller contact with each other in a feeding state in which the feeding roller and the auxiliary feeding roller feed the medium; and
a second displacement member configured to be displaced between a second non-contact position and a second contact position, the second non-contact position being a position at which the medium placed on the medium placement unit and the auxiliary feeding roller do not contact with each other in the feeding standby state, the first contact position being a position at which the medium placed on the medium placement unit and the auxiliary feeding roller contact with each other in the feeding state, wherein
the second displacement member is displaced from the second non-contact position to the second contact position as the first displacement member is displaced from the first non-contact position to the first contact position, and
the second displacement member is displaced from the second contact position to the second non-contact position as the first displacement member is displaced from the first contact position to the first non-contact position.

2. The image reading apparatus according to claim 1, comprising:
a first gear provided to a rotary shaft of the feeding roller;
a second gear provided to a rotary shaft of the auxiliary feeding roller; and
a gear train configured to be meshed with the first gear and the second gear, wherein
the gear train is provided between the first gear and the second gear in the feeding direction, and is provided on an opposite side of the second displacement member from the auxiliary feeding roller in a width direction intersecting with the feeding direction.

3. The image reading apparatus according to claim 1, wherein a feeding speed at which the auxiliary feeding roller feeds the medium is lower than a feeding speed at which the feeding roller feeds the medium.

4. The image reading apparatus according to claim 1, wherein the auxiliary feeding roller has elasticity higher than that of the feeding roller.

5. The image reading apparatus according to claim 4, comprising:
a separating roller being provided at a position facing the feeding roller and being configured to, when a plurality of media is placed on the medium placement unit, separate one of the plurality of media by nipping the one of the plurality of media with the feeding roller, wherein the separating roller has elasticity higher than that of the feeding roller.

6. The image reading apparatus according to claim 1, wherein
when the feeding roller and the auxiliary feeding roller start feeding the medium, the feeding roller and the auxiliary feeding roller rotate, the first displacement member is displaced from the first non-contact position to the first contact position, and the second displacement member is displaced from the second non-contact position to the second contact position.

7. The image reading apparatus according to claim 1, wherein when the feeding roller and the auxiliary feeding roller finish feeding the medium, the first displacement member is displaced from the first contact position to the first non-contact position, the second displacement member is displaced from the second contact position to the second non-contact position, and the feeding roller and the auxiliary feeding roller stop rotating.

8. The image reading apparatus according to claim 1, wherein the second displacement member includes a first moving portion and a second moving portion, the auxiliary feeding roller is provided between the first moving portion and the second moving portion in a width direction intersecting with the feeding direction, and when the second displacement member is at the second non-contact position, the first moving portion and the second moving portion protrude from a placement surface of the medium placement unit for the medium with respect to the auxiliary feeding roller.

9. The image reading apparatus according to claim 8, wherein the first moving portion and the second moving portion are provided with inclination surfaces upstream and downstream thereof in the feeding direction, and a downstream inclination surface of the inclination surfaces that is provided downstream in the feeding direction is longer than an upstream inclination surface of the inclination surfaces that is provided upstream in the feeding direction.

10. The image reading apparatus according to claim 1, comprising:

a transport roller pair being provided downstream of the feeding roller in the feeding direction and being configured to transport the medium fed by the feeding roller to the reading unit, wherein a driving force from a driving source rotates two rollers together that form the transport roller pair and face each other.

* * * * *